Patented Oct. 10, 1944

2,359,980

UNITED STATES PATENT OFFICE 2,359,980

PROCESS FOR REFINING PINE OLEORESIN

Elmer E. Fleck, Silver Spring, Md.; dedicated to the free use of the People in the territory of the United States No Drawing. Application August 8, 1941,
Serial No. 406,006

10 Claims. (Cl. 260—101)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to the processing of pine oleoresin by means of maleic anhydride and selected solvents to produce a new type of rosin, and the addition product of 1-pimaric acid with maleic anhydride in a pure form.

The object of this invention is to make available in pure form the addition product of 1-pimaric acid, and maleic anhydride.

A further object of my invention is to make a type of rosin free from the isomerization products of 1-pimaric acid.

In accordance with my invention, pine oleoresin is dissolved at a temperature below 75° C. in a solvent selected from the group of aliphatic hydrocarbons, such as, for example, petroleum ether, heptane, heptene, hexane, hexene, pentane, pentene, propane, etc., and turpentine. Solvents boiling below room temperature at atmospheric pressure may be used at temperatures up to 75° C. under pressure, without changing the results of my process. The dilution of the oleoresin may be accomplished in containers open to the air, although less oxidation of the oleoresin occurs when an inert atmosphere, such as nitrogen, or carbon dioxide, is used.

The dirt, chips, water, etc., present in crude pine oleoresin are removed by settling and filtration. The filtrate is reacted with maleic anhydride at a temperature below 75° C. The addition product of 1-pimaric acid and maleic anhydride crystallizes from the reaction mixture. This is removed by filtration and a modified rosin and turpentine are prepared from the filtrate by the usual procedure of steam distillation.

In the United States, the pine oleoresin of commerce is obtained largely from the Pinus palustris (Longleaf) and the Pinus caribaea (Slash) and contains dirt, chips, water, etc. The pine oleoresin freed from dirt, chips, water, etc., consists of about 20-25% turpentine, 30-40% 1-pimaric acid, 5-10% neutral resenes, 3-4% dihydropimaric acid, 15-20% d-pimaric acid and the remainder of acidic material, which has been assumed to be a mixture of isomers, other than those named above, of the formula $C_{20}H_{30}O_2$.

During commercial production of rosin and turpentine from this pine oleoresin by steam distillation, the temperature of the pine oleoresin is increased to 180–190° C. This high temperature is known to isomerize the 1-pimaric acid present in pine oleoresin to 1-abietic acid (Bul. Soc. Chem., [4] 29, 718, 727 (1921); 39 1029 (1926)), and no evidence of the presence of unchanged 1-pimaric acid has been found in the rosin of commerce. The presence of 1-abietic acid in rosin is not desirable because 1-abietic acid $[\alpha]_D^{20}-104°$, is the least stable of the known resin acids (U. S. Patent 2,239,555) toward oxidation and gives yellow oxidation products which are undesirable in varnish, paper size, soap, etc. 1-abietic acid is also undesirable because it is readily crystallizable and is largely responsible for the objectionable crystallization of some rosins.

By removing 1-pimaric acid from the pine oleoresin before oleoresin is subjected to a high degree of heat, the chief source of 1-abietic acid in the rosin is removed. Thus, 1-pimaric acid can be caused to react quantitatively with maleic anhydride at room temperature (Weinhaus and Sandermann, Ber., 69, 2202 (1936)) (Ruzicka and Bacon, J. Soc. Chem. Ind., 55, 546 (1936); Helv. Chem. Act., XX, 1552 (1937)) to produce an addition product of the formula $C_{24}H_{32}O_5$ which melts at 226–229° C., and is represented by the structural formula:

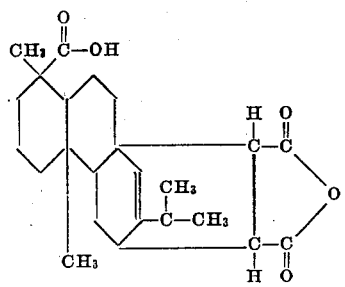

Heretofore, no method was known for removing this addition product in the pure form from the pine oleoresin mixture completely enough to prevent this crystalline compound from itself imparting crystallizing properties to the resulting rosin, just as does 1-abietic acid.

I have found that the use of a solvent chosen from the group of low boiling aliphatic hydrocarbons, or of turpentine, will cause this addition product to crystallize almost completely from the solution.

It further has been found that this crystalline addition product may be readily removed by filtration, and that this material is obtained in very high purity, melting above 220° C., without further purification. For this purpose, dilutions of about 2 parts solvent to 1 part oleoresin is preferred, but this may be varied over wide limits, depending on the speed and completeness of the crystallization that is desired.

Maleic anhydride may be added to the solution of oleoresin in the powdered form, or as a saturated solution in acetone, ethyl acetate or any other non-reacting solvent that is soluble in aliphatic hydrocarbons, or turpentine. Where a solvent is used for the maleic anhydride, the reaction is more rapid. The approximate amount of maleic anhydride required is added to the oleoresin solution and if an excess is used a yellow color will remain after two hours' reaction time. This color is then discharged by addition of small amounts of filtered oleoresin dissolved in aliphatic hydrocarbon or turpentine.

The addition of 1-pimaric acid and maleic anhydride is exothermic. The preferred temperature for the reaction is from 30 to 50° C. but temperatures lower than this, and as high as 75° C., can be employed.

The addition product of 1-pimaric acid, and maleic anhydride, is of importance because it may be used as a starting material for the production of high grade resins, used in varnishes, by the usual methods of reaction with polyhydroxy alcohols. It may also be used as a starting material for the preparation of dyes of the rhodamine and phthalein types. Likewise, my process makes possible the production of this pure chemical at low cost. This addition product is the only pure acidic chemical compound easily made from the complex mixture of resin acids found in oleoresin.

The filtrate from the separation of the addition product may be converted into a modified rosin, and turpentine, by the usual procedure of steam distillation. Where low boiling aliphatic hydrocarbons are used, fractionation is needed to separate this hydrocarbon from the turpentine, but this is accomplished by any well-known methods. Such fractionation is not difficult, because of the great difference in boiling point between the aliphatic hydrocarbon solvent and turpentine.

My process may be combined with the process of the filtration of pine oleoresin as described in U. S. 2,086,777 and U. S. 2,176,660. Thus, instead of starting with pine oleoresin, either the crystalline portion or the filtrate portion may be used, and this process applied to either, or both, fractions, with suitable modification as to dilution with solvent, and to the amount of maleic anhydride added to correspond to changed amount of 1-pimaric acid present.

When turpentine alone is used for the solvent, my process may be combined with present processes of oleoresin cleaning, following the cleansing process, provided that during the cleansing process the temperature of the solution of the crystalline portion of the oleoresin in turpentine and the washing with water is kept below 75° C., in order to prevent isomerization of the 1-pimaric acid by the action of heat.

In any event, the solution of oleoresin in aliphatic hydrocarbon, or turpentine, must be freed of water drops before the maleic anhydride is added so as to prevent the maleic anhydride from forming maleic acid by hydrolysis. This may be accomplished by filtration, and in the case where low boiling aliphatic hydrocarbons are used the specific gravity of the solution is lowered enough to permit the separation of water, by settling.

The modified rosin produced by my process is of the non-crystallizing type. Other non-crystalline rosins have been made, but differ from this rosin in the manner in which this property is produced. Thus, U. S. Patent 2,081,889 teaches that a non-crystalline rosin may be made by addition of high molecular weight synthetic resins to ordinary rosin. Also, U. S. Patent 2,176,660 teaches the production of a non-crystalline rosin by filtration of the pine oleoresin and production of a non-crystalline gum rosin from the filtrate by ordinary steam distillation. In the present invention, this non-crystalline property has been effected by removal of the 1-pimaric acid, the precursor of the objectionable 1-abietic acid, as an insoluble addition product with maleic anhydride.

This modified rosin will have about the same color grade as ordinary rosin produced from the same oleoresin by steam distillation. Because of the greater content of stable resin acids such as d-pimaric $[\alpha]_D^{20} + 73°$ and dihydropimaric $$[\alpha]_D^{20} + 107°$$

the optical rotation of my new resin will range from $[\alpha]_D^{20} + 20°$ to $[\alpha]_D^{20} + 35°$ (all rotations in 2% solution in absolute alcohol). This is a higher positive rotation than is found in ordinary rosin made from oleoresin. Such rosin shows a specific rotation of from slightly negative values to about $+15°$. Wood rosin possesses a rather strong negative specific rotation due to considerable content of 1-abietic acid $$[\alpha]_D^{20} - 104°$$

The melting point of my new modified rosin is higher than that of ordinary rosin and ranges between 82–87° C. The acid number is also higher than ordinary rosin, ranging from 175 to about 185. The resene content of my modified rosin is about one-third higher than ordinary rosin. These properties are desirable in rosins used for the production of varnish materials, paper size, etc.

Due to greater content of d-pimaric acid and dihydropimaric acid, and the very low content of 1-pimaric isomerization products, my new modified rosin is more stable than ordinary rosin toward oxidation, and hence is better suited for the manufacture of ester gums, paper sizes, etc., than ordinary rosin.

The following examples illustrate, but do not limit my process:

*Example I.*—One hundred grams of longleaf oleoresin was stirred with 200 cc. of n-pentane, at room temperature, until complete solution of the crystalline material occurred. The mixture was allowed to stand until dirt, chips, water, etc., had settled to the bottom and then the solution was decanted through a filter. The solution was stirred vigorously and 7 g. of maleic anhydride, dissolved in 5 cc. of acetone, was added rapidly. The solution became yellow in color and the temperature began to increase. Cooling was applied to hold the temperature to 30° C., because of the low boiling point of the solvent. At the end of one hour, crystals began to form. At the end of two hours, the yellow color had disappeared and the reaction mass was cooled to 10° C., and filtered. The filter cake was washed with 20 cc. of n-pentane, and then air dried. Weight of 22 g., melting point 223-228° C.

The n-pentane was distilled off directly, and the turpentine was then removed by steam distillation. The flask was heated in a bath at 190-200° C. during the steam distillation. The rosin obtained had an acid number of 183, and $[\alpha]_D^{20}+36°$ (2% in absolute alcohol).

*Example II.*—One hundred grams of longleaf oleoresin was dissolved in 200 cc. of turpentine, at room temperature. The solution was freed of dirt, chips, water, etc., by filtration. The filtrate was stirred and 7 g. of maleic anhydride dissolved in 5 cc. of acetone was added rapidly. The solution became yellow and the temperature rose to 41° C. No cooling was applied. At the end of an hour, the yellow color had disappeared and the reaction mass had cooled to 37° C. Stirring was continued for another hour, during which crystallization took place. The reaction mass was cooled to 10° C., and filtered. The filter cake was washed with 20 cc. of turpentine. The wet cake weighed 23 g., and after drying at 100° C. in vacuum it weighed 20 g. The product melted at 227-229° C.

The filtrate was subjected directly to steam distillation from a bath heated at 180-200° C. The resin obtained had an acid number of 180 and a softening point of 84° C. (A. S. T. M. method) and $[\alpha]_D^{20}+23°$ (2% in absolute alcohol).

*Example III.*—Example II was repeated, except that the maleic anhydride was added in powdered form instead of in acetone solution. After two hours' stirring the temperature of the reaction was raised to 60° C. to facilitate crystallization. At the end of one-half hour, the temperature was lowered to 10° C. and maintained at this point for 15 minutes. The filtered and dried product weighed 23 g. and melted at 220-225° C.

Resin made from the filtrate by the method described above had an acid number of 180, a softening point of 84° C. (A. S. T. M. method) and an $[\alpha]_D^{20}+23°$.

*Example IV.*—One hundred grams of longleaf oleoresin was dissolved in 200 cc. of n-hexane at room temperature. The dirt, chips, and water were removed by decantation and filtration. The filtrate was stirred while 7 g. of powdered maleic anhydride was added. The temperature of the reaction rose to 37° C. At the end of one hour, crystals began to separate. After two hours, the mass was cooled to 10° C., filtered and the filter cake washed with 20 cc. of n-hexane. The product weighed 20 g. and melted at 220-226° C.

Resin made from the filtrate by steam distillation had an acid number of 176 and a softening point of 83° C.

*Example V.*—One hundred grams of slash oleoresin was dissolved in 200 cc. of n-pentane and the mixture freed from dirt, chips, and water by filtration. The filtrate was stirred while a solution of 7 g. of maleic anhydride, in 4 cc. of acetone, was added. The reaction mass was cooled to hold the temperature at 30° C. Crystallization started at the end of one hour, and at the end of two hours the temperature was lowered to 10° C., and held at this point for 15 minutes. The addition product was removed by filtration and washed with 20 cc. of n-pentane. When dried at 100° C. it weighed 17 g. and melted at 224-227° C.

The filtrate was steam distilled and the resin obtained had an acid number of 179, a softening point of 84° C. (A. S. T. M. method) and an $[\alpha]_D^{20}+35°$.

*Example VI.*—One hundred grams of slash oleoresin was dissolved in 200 cc. of turpentine at room temperature. The mixture was freed from dirt, chips and water by filtration. The filtrate was stirred and 7 g. of powdered maleic anhydride was added. The maleic anhydride dissolved completely and the temperature increased to 36° C. At the end of 2 hours, the solution was still yellow so the color was discharged by addition of a small amount of filtered oleoresin dissolved in turpentine. Crystallization was allowed to continue for an additional 2 hours, and then the reaction mass was filtered, and the filter cake washed with 20 cc. of turpentine.

When dried in vacuum at 100° C., the addition product weighed 14 g. and melted at 223-227° C.

The filtrate was steam distilled to remove the turpentine. The resulting resin had an acid number of 180, a softening point of 86° C., and an $[\alpha]_D^{20}+24°$.

Having thus described my invention, what I claim for Letters Patent is:

1. A process for the preparation of the addition product of l-pimaric acid and maleic anhydride from pine oleoresin in a high state of purity, which comprises reacting a solution of pine oleoresin substantially free from water in low boiling aliphatic hydrocarbon with maleic anhydride at temperatures below 75° C., and thence removing the addition product from the reaction mass by filtration.

2. A process for the preparation of the addition product of l-pimaric acid and maleic anhydride from pine oleoresin in a high state of purity, which comprises reacting a solution of 1 part of pine oleoresin substantially free from water in not more than 3 parts of low boiling aliphatic hydrocarbon solvent with maleic anhydride at a temperature below 75° C., and thence removing the insoluble addition product from the reaction mass by filtration.

3. A process for the preparation of a new type of resin by removal of l-pimaric acid from pine oleoresin, which comprises reacting a low boiling aliphatic hydrocarbon solution of pine oleoresin substantially free from water with maleic anhydride at a temperature of 30° to 50° C. and removing the insoluble addition product of l-pimaric acid and maleic anhydride by filtration, and thence removing the hydrocarbon solvent by steam distillation from the filtrate.

4. A process for the preparation of a new type of resin by the removal of l-pimaric acid from pine oleoresin, which comprises reacting a low boiling aliphatic hydrocarbon solution of pine oleoresin substantially free from water with maleic anhydride at a temperature below 75° C.; thence removing the insoluble addition product of l-pimaric acid and maleic anhydride by filtration, and thence removing the hydrocarbon solvent by steam distillation from the filtrate.

5. A process for the preparation of a new type of resin by the removal of l-pimaric acid from pine oleoresin, which comprises reacting a solution of 1 part pine oleoresin substantially free from water dissolved in not more than 3 parts of low boiling aliphatic hydrocarbon solvent with maleic anhydride at a temperature below 75° C.; thence removing the insoluble addition product of l-pimaric acid and maleic anhydride by filtration, and thence removing the hydrocarbon solvent and turpentine by steam distillation from the filtrate.

6. The process comprising adding maleic anhydride to pine oleoresin, diluted with turpentine at a temperature below 75° C. to form a solution substantially free from water whereby the l-pimaric acid in the oleoresin and the maleic anhydride react to form the addition product l-pimaric acid—maleic anhydride in crystalline form, separating the liquid phase from the crystalline phase, evaporating the turpentine of the liquid phase and recovering the resulting rosin.

7. A process for the preparation of the addition product of pimaric acid and maleic anhydride from pine oleoresin in a high state of purity which comprises reacting a solution substantially free from water of pine oleoresin in turpentine with maleic anhydride at a temperature of 30° to 50° C., and thence removing the insoluble addition product by filtration.

8. A process for the preparation of the addition product of l-pimaric acid and maleic anhydride from pine oleoresin in a high state of purity which comprises reacting a solution substantially free from water of pine oleoresin in turpentine with maleic anhydride at temperatures below 75° C., and thence removing the addition product from the reaction mass by filtration.

9. A process for the preparation of a new type of resin by removal of l-pimaric acid from pine oleoresin which comprises reacting a turpentine solution substantially free from water of pine oleoresin with maleic anhydride at a temperature of 30° to 50° C. and removing the insoluble addition product of l-pimaric acid and maleic anhydride by filtration, followed by removing the turpentine from the filtrate by steam distillation.

10. A process for the preparation of a new type of resin by removal of l-pimaric acid from pine oleoresin which comprises reacting a turpentine solution substantially free from water of pine oleoresin with maleic anhydride at a temperature below 75° C., thence removing the insoluble addition product of l-pimaric acid and maleic anhydride by filtration, and thence removing the turpentine from the filtrate by steam distillation.

ELMER E. FLECK.